United States Patent [19]

Ufland

[11] Patent Number: 5,203,446
[45] Date of Patent: Apr. 20, 1993

[54] SINGLE AND CONTINUOUS FLEXIBLE BELT CONVEYOR

[76] Inventor: Jared Ufland, National Conveyor Corp. 6905 Beck Ave., North Hollywood, Calif. 91605

[21] Appl. No.: 764,283

[22] Filed: Sep. 23, 1991

[51] Int. Cl.$^5$ .............................................. B65G 25/00
[52] U.S. Cl. ................................. 198/465.2; 198/725; 198/842; 198/844.2
[58] Field of Search ................. 198/465.2, 725, 844.2, 198/817, 831, 803.01; 134/70, 71, 72, 73, 74, 125

[56] References Cited

U.S. PATENT DOCUMENTS

| | | | |
|---|---|---|---|
| 3,047,127 | 7/1962 | McGow | 198/725 X |
| 3,289,682 | 12/1966 | Naslund | 134/125 |
| 3,289,818 | 12/1966 | Kittredge | 198/817 |
| 4,410,081 | 10/1983 | Weihe, Jr. | 198/725 |
| 4,641,672 | 2/1987 | Lewhart | 134/70 X |
| 5,009,306 | 4/1991 | Roderick et al. | 198/817 X |

FOREIGN PATENT DOCUMENTS 2220903  1/1990  United Kingdom .............. 198/813

Primary Examiner—Robert P. Olszewski
Assistant Examiner—Cheryl L. Gastineau
Attorney, Agent, or Firm—Albert M. Herzig

[57] ABSTRACT

A conveyor mechanism for transporting trays utilizing a simple, single closed belt loop that is round in cross-section. The belt runs in and over a slider bed in straight sections and/or curved sections, and its upper edge extends above the slider bed so as to be exposed to the bottom of the trays whose weight gives the belt a frictional coefficient of engagement for transporting therealong. Line contact is provided between the transported trays and the topmost edge of the belt on which it is functionally balanced to limit the tipping motion of the load. The belt is kept operative by a motor, and guided in pulleys, slots or guides and guards, and thereby the load in effect "walks along the belt".

1 Claim, 4 Drawing Sheets

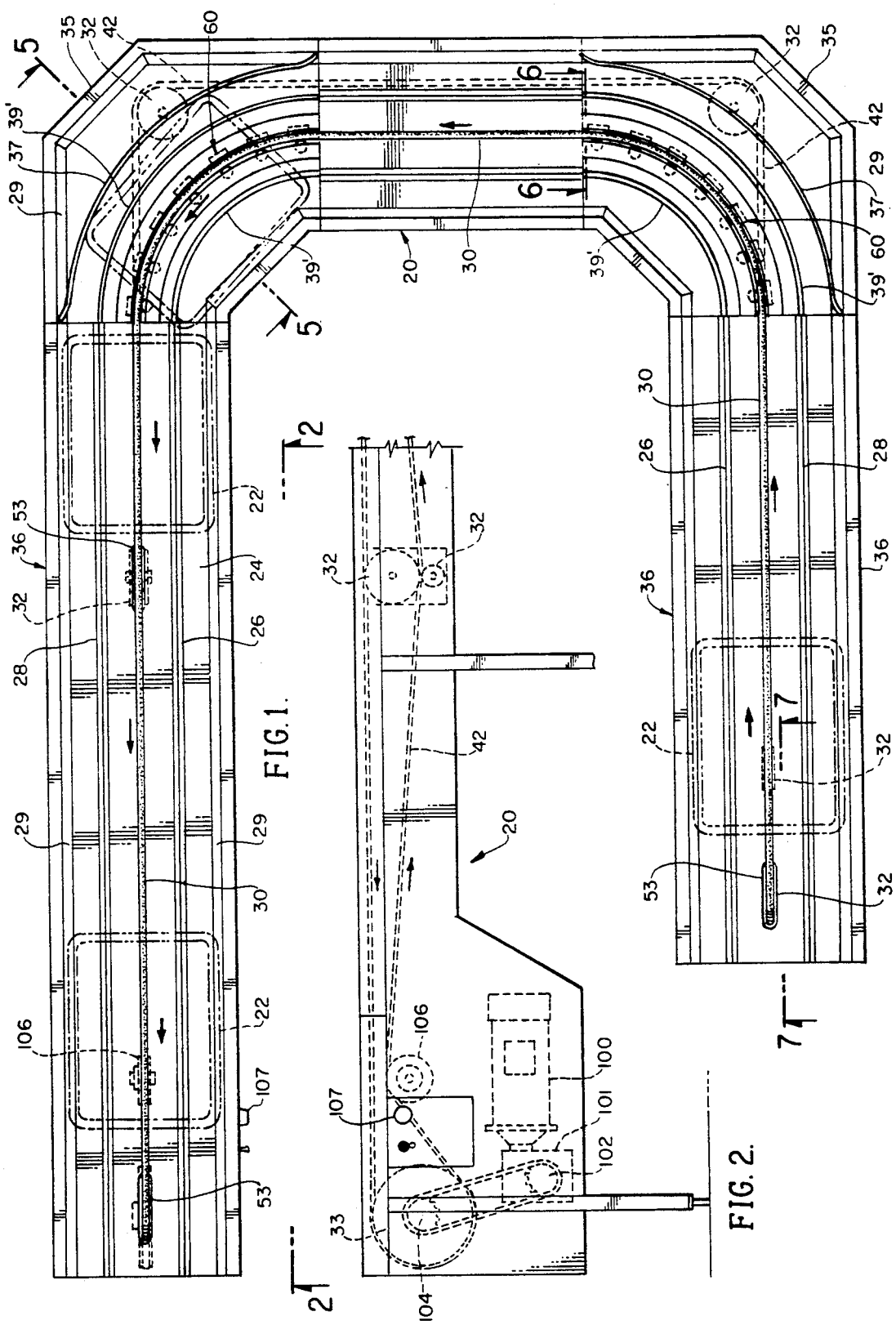

SINGLE AND CONTINUOUS FLEXIBLE BELT CONVEYOR

BACKGROUND OF THE INVENTION

1. Brief Summary of the Invention

The present invention comprises a unique single, continuous flexible belt conveyor which is particularly suitable to the automatic return of trays, boxes and other containers of dirty dishes most commonly used in restaurants, hotels, and hospitals.

This invention provides unique simplification and surprising results in changing from two parallel belts to a single continuous belt. The conveyor belt and its parts and its mode of operation are a striking departure from the past. The single continuous belt includes the transport run and the return run and readily adjusts to any turns. The resulting conveyor belt is clean, simple, flexible, versatile and less costly to make and to operate and maintain.

2. Brief Summary of the Related Art

This invention starts with the state of the art which utilizes two parallel and spaced apart belts moving at differing speeds and in differing lengths where the belts make turns and where separate length parts of the belts must be provided for the turns to which different sections must be added for the next straight run if any.

Earlier systems utilized wide, segmented belts as well as two belts, inner and outer, for making turns. Because of its adaptable simplicity the motor drive and housing for the conveyor belt can be located below, above or beyond the slider bed rather than as heretofore, behind a dish table presenting difficult access to the conveyor for approaching, servicing and cleaning the equipment.

The parts are all fully accessible and exposed for cleaning and present a simplicity of appearance and facility of operation, and repair, if any is needed. Breakage is minimized or eliminated.

Preliminary testing and experimentation has eliminated initial problems of vibration and led to changes in the former length of unsupported runs of the belt by suitable supporting and guiding wheels and pulleys. Separate drives are not required for curves and corner sections.

The belt and its load perform a balancing act similar to that of a trapeze artist walking a rope and extending weights on each side to keep the needed balance to the same purpose as the tilt limiting ridges which are slightly below the top surface of the belt.

The belt is made operative by means of a suitable motor, and guided in pulleys and slots in the slider bed and it similarly returns by means of suitable guides, pulleys and guards.

The improvement of the single belt adaptively converts the closest prior art from a duplicative and complex belt structure of considerable breadth and composed of segmented moving parts into a structure of utmost utility, simplicity and economy.

BRIEF DESCRIPTION OF THE DRAWINGS

FIG. 1 is a plain view of a conveyor embodying a preferred form of the invention.

FIG. 2 is a fragmented side view taken on FIG. 1 along position 2—2 of FIG. 1.

DESCRIPTION OF THE PREFERRED EMBODIMENT

Figure 3:
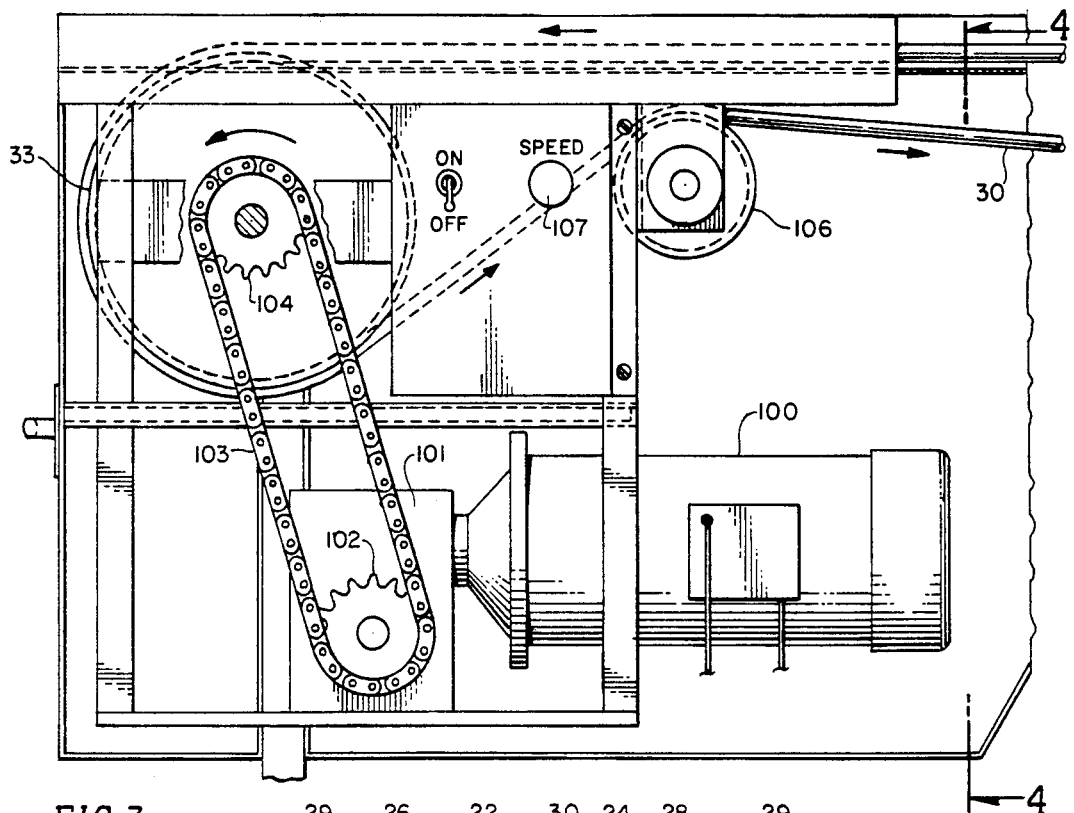
FIG. 3 is an enlargement of the motor and driving mechanism, of FIG. 2.
Figure 4:
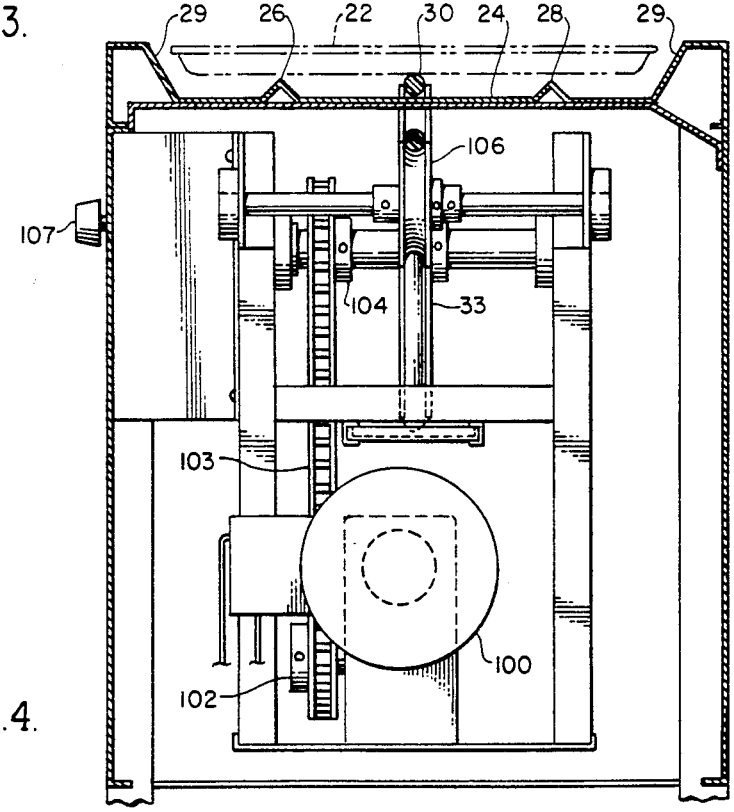
FIG. 4 is a vertical sectional along the line 4—4 of FIG. 3.

Referring more particularly to the drawings illustrating the preferred embodiment of the invention:

A single-band conveyor 20 remarkably supports a number of conventional trays 22 on and along a stainless steel slider bed 24. The slider bed includes at least one, preferably two, ridges 26 inner ridge and 28 outer ridge formed in the stainless steel material of the slider bed. In this embodiment the ridges are of inverted V-shaped metal. The slider bed is defined by side walls 29.

Figure 8:
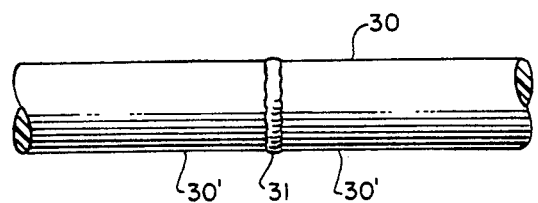
FIG. 8 is an enlarged view as on the line 8—8 of FIG. 7 showing the integral butt welded union of the endless belt.

A belt 30 comprises a continuous loop of ⅜" outside diameter solid cylinder of polyurethene whose ends 30', have been butt-welded together in a known manner as illustrated at 31 in FIG. 8. A plurality of idler pulleys of varying diameter generally designated at 32 guide the belt drawing their power from the motor 100.

A belt return system is generally designated at 42 and a friction reducing system is generally noted at 34.

FIG. 1 illustrates 90 degree turns at two corners 35, to connect two long parallel runs 36, illustrated on the top and bottom of FIG. 1.

The corner sections 35, includes the walls of the slider bed 29 and guides 37 for the edges and corners of the trays 22 as best illustrated in FIG. 1.

Support guides 39 (FIGS. 1 and 5) can include ⅜"O.D. reinforcing stainless steel rods 39' supported above the slider bed floor in lieu of the inverted V ridges for guiding and supporting the trays around corners at the same level as the tops of the ridges 26 and 28, as part of auxiliary balance support of the trays on the belt.

Figure 6:
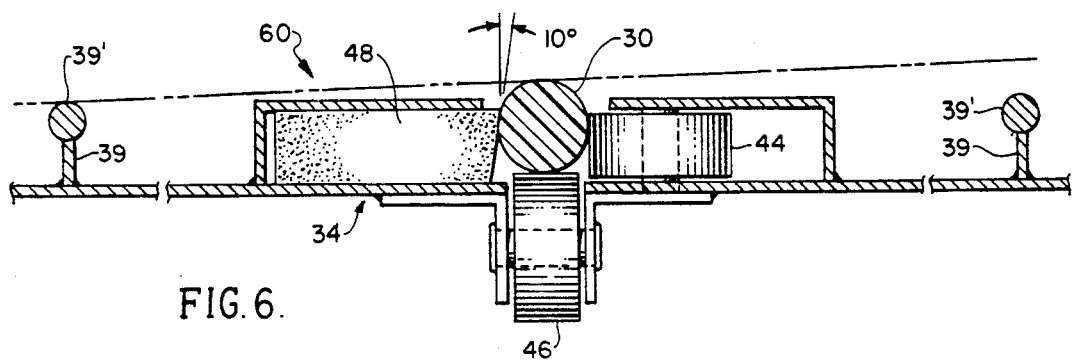
FIG. 6 is an enlarged vertical sectional view taken as on a line 6—6 of FIG. 1.

The belt return 42 comprises a part of the belt system. In a first preferred form (FIG. 6), the belt return includes a vertically mounted brass wheel 44 on one side of the belt 30 and a horizontally mounted brass wheel 46 below and supporting the belt 30. On the opposite side of the belt a self-lubricating guide member, UHMW guide 48, having an approximately 10 degree taper abutting and tending to prevent release of the belt 30 as best illustrated in FIG. 6.

In a second preferred embodiment for negotiating the belt around a turn (FIGS. 9 and 10), a corner guide pulley 50 is secured at the top of the conveyor by a mounting stud 51. The lower rim 52 of the drive pulley supports the belt 30 and guides it in the groove 54. The upper side 55 of the pulley is flat and without a flange. The stud head nests in a counterbore 56 to raise the top of the belt above the flat side of the pulley for clear supporting engagement with the bottoms of the trays 22'. The lower side of the pulley is supported by a wedge 57 at an approximately 3 degree angle. Thereby trays can be freely transported around a curved portion of the conveyor by being balanced on the exposed top of the belt 30 by the auxiliary guide support systems of the first embodiment shown in FIGS. 5 and 6, or by the second embodiment of FIGS. 9 and 10 which has also smoothly succeeded in negotiating a 90 degree turn.

OPERATION OF SYSTEM

Traditional conveyor systems use belts approximately 10" wide in making turns. Other systems use two belts, an inner and outer, to make turns. Most belt units require separate drives for straight sections and corner sections respectively. The instant invention utilizes a single belt in the entire operation, the belt extends above the inverted V sections 26 and 28 as well as above the pulleys 50 as illustrated in FIG. 10.

Pulley wheels for supporting the belt are accommodated through slots 53, in the slider bed preferably at intervals of 5 to 7 feet therealong. The trays 22 ride upon the belts as supported by the pulleys in the slider bed powered from a driving pulley 33.

The belt's material polyurethene acts as a frictional drive to support the weight of the trays and while so being supported and driven, the trays are in active balance by their engagement with one of the ridges 26, 28, being best continually driven and balanced between the belt and one of the corresponding ridges 26 and 28.

Figure 5:
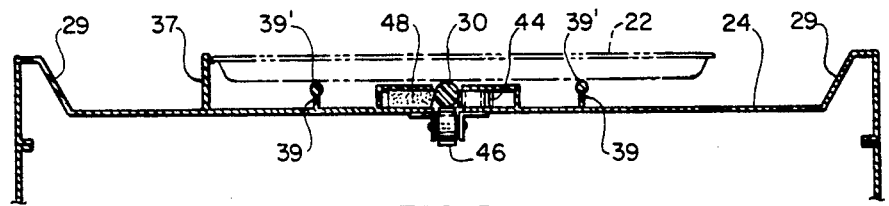
FIG. 5 is an enlarged vertical sectional view on the line 5—5 of FIG. 1.
Figure 9:
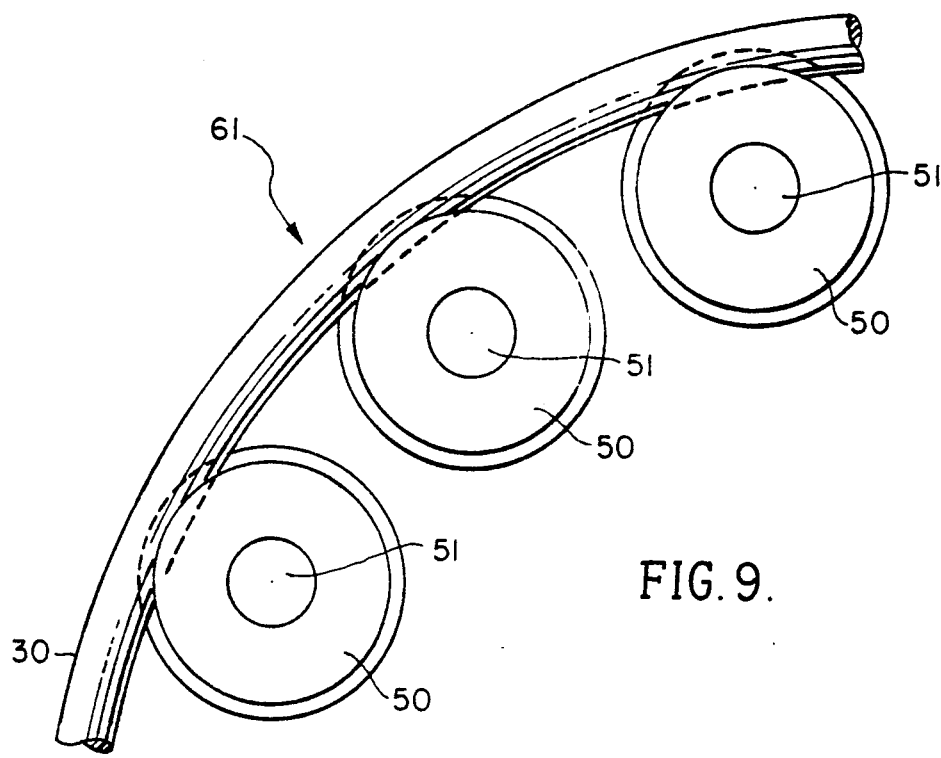
FIG. 9 is a top view of a second preferred embodiment of a corner guide pulley for use on top of the conveyor to negotiate a turn.
Figure 10:
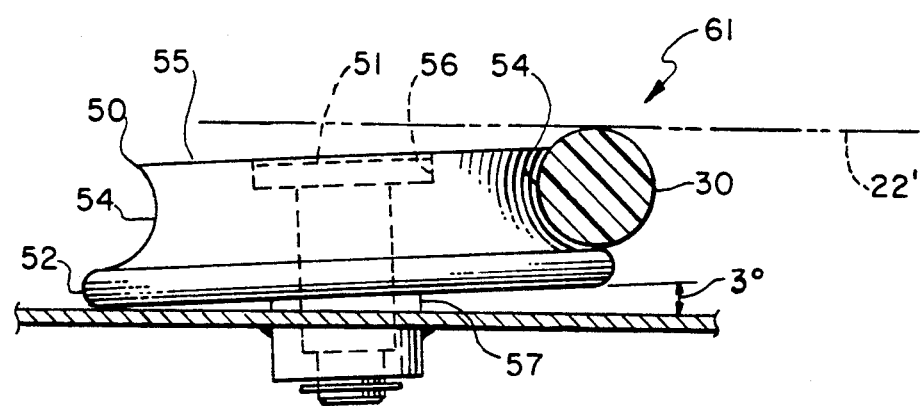
FIG. 10 is a side view of the pulley wheel of FIG. 9 and associated parts.

The belt guide turning units 60 of FIGS. 1, 5 and 6; or 61 of FIGS. 9, and 10 as illustrated are distributed around curves of the corner sections, or other curves, may be preferably 7 in number to carry the belt in its curvature and longitudinal movement in the direction of the arrows as illustrated, being guided therearound by the guiderails 37 and support guides 39.

The mechanism driving the described conveyor belt consists of a conventional motor such as 100 having a gear reduction means 101 driving a gear 102 and sprocket chain 103 and a second gear 104 of reduced size relative to the drive pulley 33.

The belt 30 is driven in the direction noted by the arrows in a driving direction adjacent to the top of the conveyor unit. In the return mode as also indicated by the directional arrows, the belt is returned past and through any desired guides 105 and pulleys 106 for adjusting the tension of the belt or for removing, replacing or repairing the same or any parts or associated parts.

Figure 7:
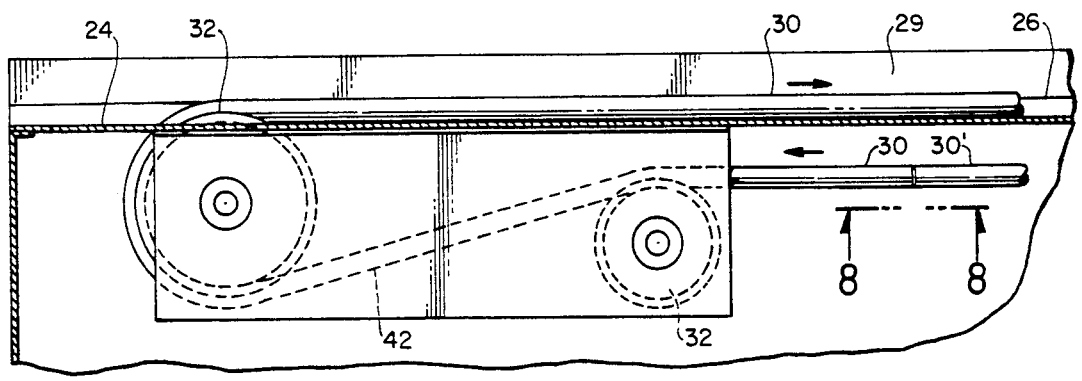
FIG. 7 is an enlarged vertical sectional view taken as on a line 7—7 of FIG. 1.

The belt is first measured out as a continuous piece including the full extent of its length and direction indicated by the directional arrows in the drawings. That length is then threaded through the conveyor around the pulley wheels and as shown in full and dotted lines to complete its continuous loop. After being so threaded a come-along is used to remove approximately 16% of the total length of the belt. For that purpose the belt excess is overlapped, clamped, cut out and butt welded as shown in FIG. 8. The operative tension of the belt in the conveyor is thereby established. Any adjustment made in its tension can be accomplished as by suitably moving one or more pulley wheels as, for example, no. 1 on 6, FIGS. 2, 3, 7 or a corner pulley such as 32 (FIG. 1). The elastic limit of the belt is approximately 200%. As may be needed, an additional section of the belt may be removed to maintain its desired tension.

A speed adjustment is controlled at 107 as is the on/off control for the conveyor for the illustrated and described parts and its conventional power supply.

Thus the present invention has been described herein with reference to a particular embodiment for a particular application. Those having ordinary skill in the art and access to the present teachings will recognize additional possible modifications, applications and embodiments within the scope thereof, including equivalents.

It is therefore intended by the appended claims to cover any and all such modifications, applications and embodiments within the scope of the present invention.

I claim:

1. In combination with a power supply including a drive means for pulling a continuous belt rounded in cross-section for transporting dishes and trays along a conveyor slider bed; said single and continuous conveyor belt extending above the slider bed and constructed and arranged for engaging and supporting the trays and dishes; auxiliary parallel balancing support means along opposite sides of and spaced from the belt for stabilizing the trays for insuring the balanced supporting of the weight of the trays on and along the top of the single conveyor belt; said belt has a frictional engagement with the trays, said trays having bottoms frictionally engaging and supported on and along said belt; means for changing the direction of the slider bed and belt; means are additionally provided for guiding the belt around corners, comprising roller means and self-lubricating guide block means which confine the belt in its longitudinal movement on both sides and at the bottom but not at the top, the parts being so adjusted and arranged that the top portion of the belt defines an arc of less than 180 degrees, extending above all surrounding structures for exposure to and supporting engagement with the bottoms of the trays.

* * * * *